US012809747B2

(12) United States Patent
Darke et al.

(10) Patent No.: US 12,809,747 B2
(45) Date of Patent: Nov. 24, 2026

(54) METHOD AND SYSTEM FOR PERFORMING OUTER LOOP ABSTRACTION FOR EFFICIENT VERIFICATION OF REACTIVE SYSTEMS

(71) Applicant: Tata Consultancy Services Limited, Mumbai (IN)

(72) Inventors: Priyanka Darke, Pune (IN); Bharti Dewrao Chimdyalwar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 323 days.

(21) Appl. No.: 18/820,572

(22) Filed: Aug. 30, 2024

(65) Prior Publication Data

US 2025/0110849 A1 Apr. 3, 2025

(30) Foreign Application Priority Data

Sep. 29, 2023 (IN) ............................ 202321065633

(51) Int. Cl.
*G06F 11/3604* (2025.01)
*G06F 8/41* (2018.01)

(52) U.S. Cl.
CPC .......... *G06F 11/3608* (2013.01); *G06F 8/443* (2013.01)

(58) Field of Classification Search
None
See application file for complete search history.

(56) References Cited

U.S. PATENT DOCUMENTS 10,733,074 B1 * 8/2020 Cok .................... G06F 11/3608
2012/0101800 A1 4/2012 Miao et al.
(Continued)

FOREIGN PATENT DOCUMENTS

EP 2913758 A1 9/2015

OTHER PUBLICATIONS

Beyer, D., Dangl, M., & Wendler, P. (2015). Combining k-Induction with Continuously-Refined Invariants. ArXiv, (Year: 2015).*
(Continued)

*Primary Examiner* — Jason D Mitchell
(74) *Attorney, Agent, or Firm* — Finnegan, Henderson, Farabow, Garrett & Dunner, LLP

(57) ABSTRACT

Reactive systems commonly feature an outer infinite loop that captures environmental input and according to the inputs decides the system's response. The outer infinite loop implies that almost every reactive system contains nested loops. Existing verification techniques, such as model checking and loop abstraction methods, often struggle in terms of accuracy and efficiency in the presence of nested loops. Present disclosure provides a method and a system for performing outer loop abstraction for verification of reactive systems. The system first checks whether code in outer loop can be executed before the outer loop. Then, the system performs optimization of the outer loop. Thereafter, the system abstracts outer loop which infinitely read and process environmental input. Further, the system transforms the input code to obtain outer loop abstracted code which is then passed on to an industrial verifier for verification of the reactive system.

15 Claims, 6 Drawing Sheets

(56) References Cited

U.S. PATENT DOCUMENTS

| | | | | |
|---|---|---|---|---|
| 2015/0242188 | A1* | 8/2015 | Darke | G06F 11/3608<br>717/106 |
| 2016/0098562 | A1* | 4/2016 | Hawblitzel | G06F 11/3604<br>726/22 |
| 2020/0250515 | A1* | 8/2020 | Rifkin | G06F 17/16 |
| 2021/0141914 | A1* | 5/2021 | Darke | G06F 21/6209 |
| 2022/0197614 | A1* | 6/2022 | Sandhupatla | G06F 8/4435 |

OTHER PUBLICATIONS

Beyer D, Dangl M. Software Verification with PDR: An Implementation of the State of the Art. Tools and Algorithms for the Construction and Analysis of Systems. 2020;12078:3-21. Published Mar. 13, 2020. (Year: 2020).*

Bharti Chimdyalwar and Shrawan Kumar. 2021. Selective path-sensitive interval analysis (WIP paper). In Proceedings of the 22nd ACM SIGPLAN/SIGBED In (LCTES 2021). Association for Computing Machinery, New York, NY, USA, 146-15 (Year: 2021).*

Dorit Nuzman and Ayal Zaks. 2008. Outer-loop vectorization: revisited for short SIMD architectures. In Proceedings of the 17th international conference on Parallel architectures and compilation techniques (PACT '08). Association for Computing Machinery, New York, NY, USA, 2-11.*

Xujie Si, Hanjun Dai, Mukund Raghothaman, Mayur Naik, and Le Song. 2018. Learning loop invariants for program verification. In Proceedings of the 32nd International Conference on Neural Information Processing Systems (NIPS'18). Curran Associates Inc., Red Hook, NY, USA, 7762-7773. (Year: 2018).*

Author: Assignee /Author N. Shaukat, S. Shuja, S. K. Srinivasan, and S. Jabeen Title: Improved Efficiency of Object Code Verification Using Statically Abstracted Object Code Title of the item: Scientific Programming Date: 2020 Publisher: Wiley.

* cited by examiner

400

```
for(i=0;i<env_input();i++){
   if(i==0)
    x = malloc(sizeof(int));
   if(x != 0)
    *x = env_input();
   if(env_input()/1000)
    z = env_input();
   while(*x > -1 && z) {
    y = *x-- + z;
    assert(y >= 1);
   }
}
```

FIG. 5A

```
i = 0;
if(i < env_input())
 x = malloc(sizeof(int));
do {
  if(x != 0)
   *x = env_input();
  if(env_input())
   z = env_input();
  while(*x > -1 && z) {
   y = *x-- + z;
   assert(y >= 1);
  }
  i++;
} while(i<env_input());
```

FIG. 5B

```
i = 0;
if(i < env_input())
 x = malloc(sizeof(int));
do {
   *x = env_input();
   z = env_input();
   while(*x > -1 && z) {
     y = *x-- + z;
     assert(y >= 1);
   }
   i++;
} while(i<env_input());
```

FIG. 5C

```
i = 0;
if(i < env_input()) {
 x = malloc(sizeof(int));
 *x = env_input();
 z = env_input();
 while(*x > -1 && z) {
  y = *x-- + z;
  assert(y >= 1);
 }
 i++;
 i = nondet();
 assume(i>=env_input());
}
```

FIG. 5D

METHOD AND SYSTEM FOR PERFORMING OUTER LOOP ABSTRACTION FOR EFFICIENT VERIFICATION OF REACTIVE SYSTEMS

PRIORITY CLAIM

This U.S. patent application claims priority under 35 U.S.C. § 119 to: Indian Patent Application No. 202321065633, filed on Sep. 29, 2023. The entire contents of the aforementioned application are incorporated herein by reference.

TECHNICAL FIELD

The disclosure herein generally relates to reactive system verification, and, more particularly, to a method and a system for performing outer loop abstraction for verification of reactive systems.

BACKGROUND

Reactive systems, as the name suggests, react to environmental inputs. In particular, they read values from the environment and execute a system based on those values. Typically, reactive systems are installed to wait and act on environmental inputs for as long as the system is running. They are generally installed to interact with humans, or other sub-systems. Thus, they can be complex, large, safety-critical, and may require a rigorous formal verification. One of the examples of the reactive system can be a user interaction panel present in a car.

In order to scale verification for such systems, bounded model checking (BMC) has been successfully used in conjunction with static analysis and code abstraction methods in industry scale verification tools. These tools generally use combinations of several techniques including program slicing, loop abstractions, and function level abstractions. However, the program slicing, and loop abstraction techniques suffer in the presence of nested loops, thereby making it difficult to use it for verification of systems using/containing nested loops.

Further, to verify reactive systems with nested loops, several verification techniques use mathematical induction to perform loop abstraction. These techniques do not perform loop optimization (even if possible) before abstracting loops to verify the code. Once loop abstraction is applied, standard optimizations cannot be applied because abstraction changes the loop behavior.

Additionally, in the abstraction, the outer loop may be represented thrice in the induction once each for the base case, induction hypothesis, and the induction check. And each instance of the outer loop may further contain three instances of the inner loop corresponding to the base case, hypothesis, and induction check of the inner loop. Hence, as the code size and the nesting depth of the loop increases, the abstractions become more complex, which hinders the model checking efficiency, and ultimately causes the verifier to run out of resources.

SUMMARY

Embodiments of the present disclosure present technological improvements as solutions to one or more of the above-mentioned technical problems recognized by the inventors in conventional systems. For example, in one aspect, there is provided a method for performing outer loop abstraction for verification of reactive systems. The method comprises receiving, by a system via one or more hardware processors, a program to be verified, wherein the program comprises a nested loop; performing, by the system via the one or more hardware processors, a loop optimization of the received program to obtain an optimized program, wherein the optimized program comprises an initialization block controlled by an initialization condition placed outside and before the loop; performing, by the system via the one or more hardware processors, an abstraction of the optimized program to obtain a simplified program; performing, by the system via the one or more hardware processors, a K-path interval analysis on each condition of one or more conditions present in an outer loop of the simplified program to obtain a truth value of an associated condition; marking, by the system via the one or more hardware processors, at least one condition of the one or more conditions as a fixed condition in the outer loop of the simplified program if the truth value of the at least one condition is identified to be true; making, by the system via the one or more hardware processors, a true path of the fixed condition unconditional in the simplified program to obtain an updated simplified program; abstracting, by the system via the one or more hardware processors, one or more environmental conditions present in the updated simplified program to obtain an abstracted program, wherein the one or more environmental conditions initialize one or more variables with an environmental input along one of a true path and a false path such that another path that does not initialize any variable is abstracted; checking, by the system via the one or more hardware processors, whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and performing, by the system via the one or more hardware processors, the OLA on the abstracted program to obtain an outer loop abstracted program, wherein the outer loop abstracted program comprises: a) a plurality of statements of the abstracted program up to the outer loop including the initialization block, b) a loop body of the abstracted outer loop, c) abstraction of the one or more variables modified by the abstracted outer loop so that the outer loop abstracted program is an over-approximation of the program, and d) an assumption on negation of an outer loop condition present in the program.

In an embodiment, wherein performing the loop optimization of the received program comprises: optimizing, by the system via the one or more hardware processors, a loop of the nested loop present in received program if the loop comprises the initialization condition, wherein the initialization condition is identified using an initialization condition identification algorithm.

In an embodiment, performing the abstraction of the optimized program comprises: assigning, by the system via the one or more hardware processors, a non-deterministic value to each of: one or more conditions present in the outer loop of the optimized program that reads an environmental input, and one or more assignments present in the outer loop of the optimized program that reads the environmental input.

In an embodiment, making the true path of the fixed condition unconditional comprises of removal of the fixed condition while keeping one or more statements present in the true path of the fixed condition.

In an embodiment, upon identifying that the truth value of a condition is false, removing, by the system via the one or more hardware processors, the condition and a true path of the condition in the simplified program to obtain the updated simplified program.

In an embodiment, abstraction of the one or more environmental conditions comprises one or more of: abstraction of the one or more environmental conditions present in the updated simplified program that initializes one or more variables only with the environmental input along its true path such that its false path does not initialize any variable, removal of at least one environmental condition of the one or more environmental conditions such that the initialization of the one or more variables along the true path becomes unconditional, abstraction of the one or more environmental conditions present in the updated simplified program that initializes variables only with environmental inputs along its false path, such that its true path does not initialize any variable, and removal of at least one environmental condition of the one or more environmental conditions so that the initialization of the one or more variables along the false path becomes unconditional.

In an embodiment, passing, by the system via the one or more hardware processors, the outer loop abstracted program to a program verifier for property verification.

In another aspect, there is provided a system for performing outer loop abstraction for verification of reactive systems. The system comprises a memory storing instructions; one or more communication interfaces; and one or more hardware processors coupled to the memory via the one or more communication interfaces, wherein the one or more hardware processors are configured by the instructions to: receive a program to be verified, wherein the program comprises a nested loop; perform a loop optimization of the received program to obtain an optimized program, wherein the optimized program comprises an initialization block controlled by an initialization condition placed outside and before the loop; perform an abstraction of the optimized program to obtain a simplified program; perform a K-path interval analysis on each condition of one or more conditions present in an outer loop of the simplified program to obtain a truth value of an associated condition; mark at least one condition of the one or more conditions as a fixed condition in the outer loop of the simplified program if the truth value of the at least one condition is identified to be true; make a true path of the fixed condition unconditional in the simplified program to obtain an updated simplified program; abstract one or more environmental conditions present in the updated simplified program to obtain an abstracted program, wherein the one or more environmental conditions initialize one or more variables with an environmental input along one of a true path and a false path such that another path that does not initialize any variable is abstracted; check whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and perform the OLA on the abstracted program to obtain an outer loop abstracted program, wherein the outer loop abstracted program comprises: a) a plurality of statements of the abstracted program up to the outer loop including the initialization block, b) a loop body of the abstracted outer loop, c) abstraction of the one or more variables modified by the abstracted outer loop so that outer loop abstracted program is an over-approximation of the program, and d) an assumption on negation of an outer loop condition present in the program.

In yet another aspect, there are provided one or more non-transitory machine-readable information storage mediums comprising one or more instructions which when executed by one or more hardware processors perform outer loop abstraction for verification of reactive systems by receiving, by a system, a program to be verified, wherein the program comprises a nested loop; performing, by the system, a loop optimization of the received program to obtain an optimized program, wherein the optimized program comprises an initialization block controlled by an initialization condition placed outside and before the loop; performing an abstraction of the optimized program to obtain a simplified program; performing a K-path interval analysis on each condition of one or more conditions present in an outer loop of the simplified program to obtain a truth value of an associated respective condition; marking at least one condition of the one or more conditions as a fixed condition in the outer loop of the simplified program if the truth value of the at least one condition is identified to be true; making a true path of the fixed condition unconditional in the simplified program to obtain an updated simplified program; abstracting one or more environmental conditions present in the updated simplified program to obtain an abstracted program, wherein the one or more environmental conditions initialize one or more variables with an environmental input along one of a true path and a false path such that another path that does not initialize any variable is abstracted; checking whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and performing the OLA on the abstracted program to obtain an outer loop abstracted program, wherein the outer loop abstracted program comprises: a) a plurality of statements of the abstracted program up to the outer loop including the initialization block, b) a loop body of the abstracted outer loop, c) abstraction of the one or more variables modified by the abstracted outer loop so that the outer loop abstracted program is an over-approximation of the program, and d) an assumption on negation of an outer loop condition present in the program.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 5A, 5B, 5C and 5D, collectively, illustrate an exemplary scenario explaining working of the system, in accordance with an embodiment of the present disclosure.

DETAILED DESCRIPTION

Figure 1:
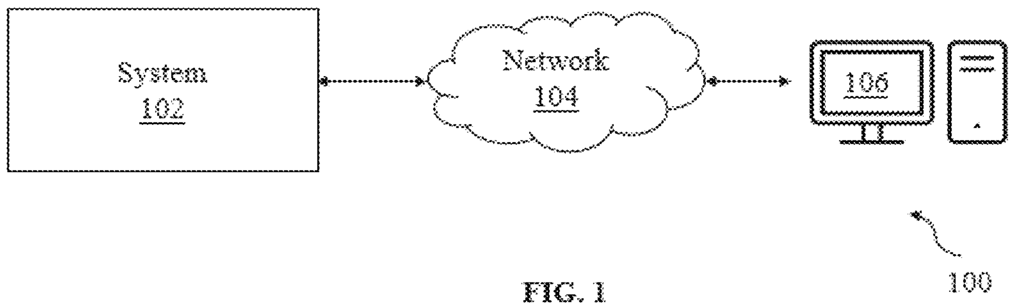
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The term "loop condition" used throughout the description refers to a part of a loop header present in a program which holds in all iterations of a loop, and does not hold after a last iteration.

The term "fixed condition" used throughout the description refers to conditions present in the program that evaluate to the same value for all iterations of the loop.

The term "initialization condition" used throughout the description refers to branching conditions present in the program which (1) hold only in a first iteration, (2) lead to an execution of a block of code before any other statements in a loop body, and (3) conditions that are checked immediately after the loop condition and before any other condition in the loop body.

The term "loop constant" used throughout the description refers to a variable that is read in the loop present in the program but never modified.

The term "environmental condition" used throughout the description refers to conditions present in a block of code that directly read environmental inputs.

The term "environmental variable" used throughout the description refers to variables present in the block of code which have direct or transitive data and control dependencies only on environmental inputs or environmental conditions.

Reactive systems, designed for embedded applications, commonly feature an outer infinite loop that captures environmental input, and the system response is decided according to the inputs. The outer infinite loop implies that almost every reactive system contains nested loops. Available verification techniques, such as model checking and loop abstraction methods, often struggle in terms of accuracy and efficiency in the presence of nested loops as these techniques apply mathematical induction to loops without performing loop optimization.

As discussed earlier, the outer loop is represented thrice in induction by verification tools—once each for the base case, induction hypothesis, and induction check. And each instance of the outer loop contains three instances of the inner loop corresponding to the base case, hypothesis, and induction check of the inner loop. Further, the hypothesis and the induction check of the outer loop can each have multiple iterations because it modifies multiple variables. So, this kind of abstraction is complex, has low accuracy, and is unnecessary, because the first iteration of the outer loop in an example presented in FIG. 5A is sufficient to analyze the property assertion. Additionally, standard optimizations cannot be applied to the loop after the abstraction. So, overall, as the code size and the nesting depth of loops increases, the abstraction performed by verification tools become more complex which hinders with the model checking efficiency, and sometimes also cause the verifier to run out of resources.

So, verification techniques that can efficiently perform verification of the reactive systems is still to be explored.

Embodiments of the present disclosure overcome the above-mentioned disadvantages by providing a method and a system for performing outer loop abstraction for verification of reactive systems. The system of the present disclosure identifies nested loops where an outer loop can be abstracted in an input program. Then, the system abstracts the identified outer loop with respect to a given property assertion, and allows all behaviors of the input program. The abstraction process performed by the system is done with respect to the property assertion, thus it may also referred as property directed outer loop abstraction (OLA). Once the system applies the OLA on the input program to generate an outer loop abstracted program, the generated outer loop abstracted program enhance the efficiency of industrial code verifiers that employ model checking for verification.

In the present disclosure, the system and the method performs outer loop abstraction (OLA) to eliminate outer loop of a nested loop present in the system, which simplifies the abstraction of nested loops, thus ensuring efficient model checking. Further, the system performs property directed abstraction which helps in selective analysis of the program, and thus reducing the overall time taken in performing the verification of the program.

Referring now to the drawings, and more particularly to FIGS. 1 through 5D, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, performing loop optimization of a program, performing a K-path interval analysis, abstracting environmental conditions present in the program, etc. The environment 100 generally includes a system 102, an electronic device 106 (hereinafter also referred as a user device 106), each coupled to, and in communication with (and/or with access to) a network 104. It should be noted that one user device is shown for the sake of explanation; there can be more number of user devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The user device 106 is associated with a user (e.g., a programmer/test engineer) who is responsible for developing/testing/verifying properties of a reactive system, such as a user interaction panel of a car etc. Examples of the user device 106 include, but are not limited to, a personal computer (PC), a mobile phone, a tablet device, a Personal Digital Assistant (PDA), a server, a voice activated assistant, a smartphone, and a laptop.

The system 102 includes one or more hardware processors and a memory. The system 102 is first configured to receive a program that is to be verified via the network 104 from the user device 106. The received program includes a nested loop i.e., a loop within one or more loops. The system 102 then performs outer loop abstraction on the received program by abstracting an outer loop that performs the following actions iteratively in a given order: 1) initializing variables, 2) reading values from the environment, 3) processing values read from the environment, and 4) passing processed values to inner loops for further computations.

As variable initializations happen only in a first iteration of the outer loop, while values from the environment are read in every iteration, so the system 102 identifies if some executable statements in an outer loop body can be executed before the outer loop without changing the semantics, for instance, by moving those statements before the outer loop. Thereafter, the system 102 performs optimization of the outer loop, and abstracts the optimized outer loop $l_0$ nesting an inner loop l to obtain an outer loop abstracted program only if one iteration of $l_0$ is sufficient to analyze a given property assertion φ present in the inner loop l, and the remaining iterations can be ignored. It should be noted that abstraction of the outer loop is possible only when the property assertion φ has direct or transitive data and control dependencies only on environmental inputs read in the current iteration of $l_0$ or on variables that are never modified in $l_0$.

Once the outer loop abstracted program is available, the system 102 may pass the outer loop abstracted program to a program verifier for property verification. The process of performing outer loop abstraction is explained in detail with reference to FIGS. 4A and 4B.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
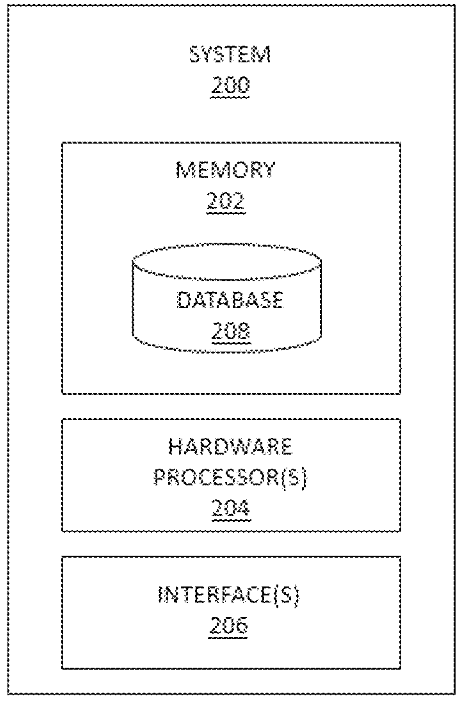
FIG. 2 illustrates an exemplary block diagram of a system for performing outer loop abstraction for verification of reactive systems, in accordance with an embodiment of the present disclosure.

FIG. 2 illustrates an exemplary block diagram of the system 102 for performing outer loop abstraction for verification of reactive systems, in accordance with an embodiment of the present disclosure. In some embodiments, the system 102 is embodied as a cloud-based and/or SaaS-based (software as a service) architecture. In some embodiments, the system 102 may be implemented in a server system. In some embodiments, the system 102 may be implemented in a variety of computing systems, such as laptop computers, notebooks, hand-held devices, workstations, mainframe computers, and the like.

In an embodiment, the system 102 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, an outer loop identification algorithm, an initialization condition identification algorithm, one or more processes and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 102 as illustrated and hereinafter described is merely illustrative of an apparatus that could benefit from embodiments of the present disclosure and, therefore, should not be taken to limit the scope of the present disclosure. It is noted that the system 102 may include fewer or more components than those depicted in FIG. 2.

Figure 3:
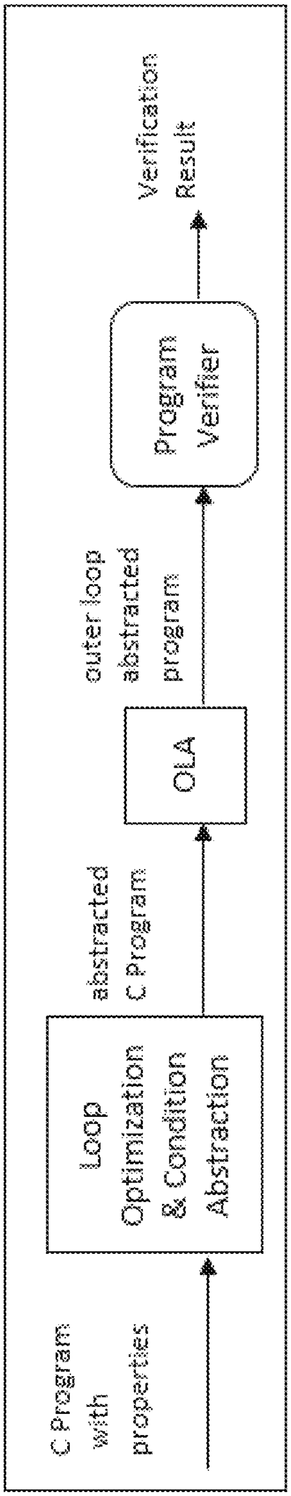
FIG. 3 illustrates a schematic block diagram representation of an outer loop abstraction process performed by the system for verification of properties of a program, in accordance with an embodiment of the present disclosure.

FIG. 3 illustrates a schematic block diagram representation of an outer loop abstraction process performed by the system 102 for verification of properties of a program, in accordance with an embodiment of the present disclosure.

As seen in FIG. 3, the system 102 first receives a program whose properties need to be verified. The system 102 then performs loop optimization and condition abstraction on the received program to obtain a simplified, updated simplified, and abstracted program. Thereafter, the system 102 performs an outer loop abstraction (OLA) process on the simplified, updated simplified, and abstracted program to obtain an outer loop abstracted program. Further, the system 102 shares the outer loop abstracted program with any industrial program verifier, such as ELABMC for property verification. Finally, the program verifier provides the verification result.

Figure 4A:
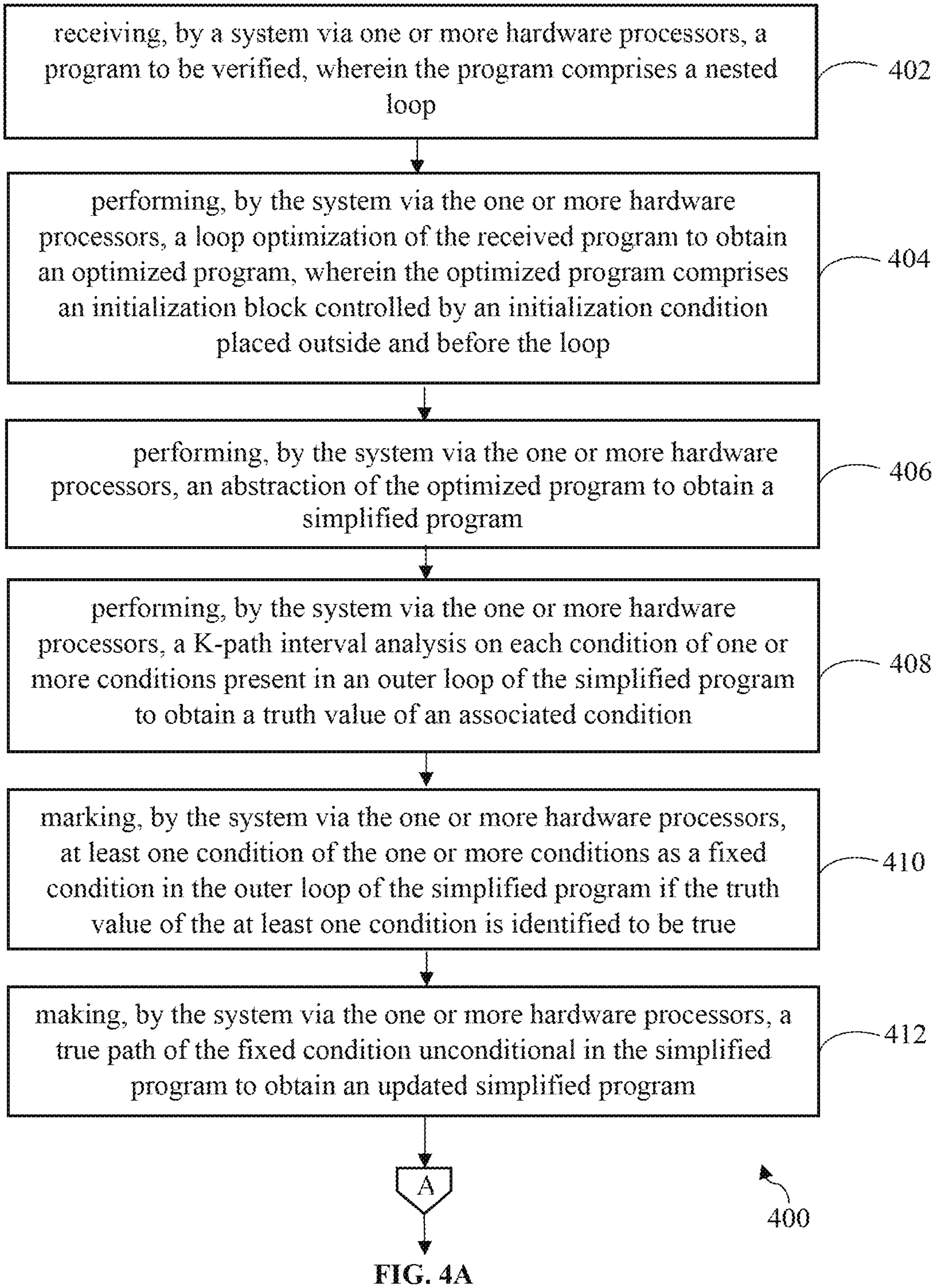
FIGS. 4A and 4B, collectively, illustrate an exemplary flow diagram of a method for performing outer loop abstraction for verification of reactive systems, in accordance with an embodiment of the present disclosure.
Figure 4B:
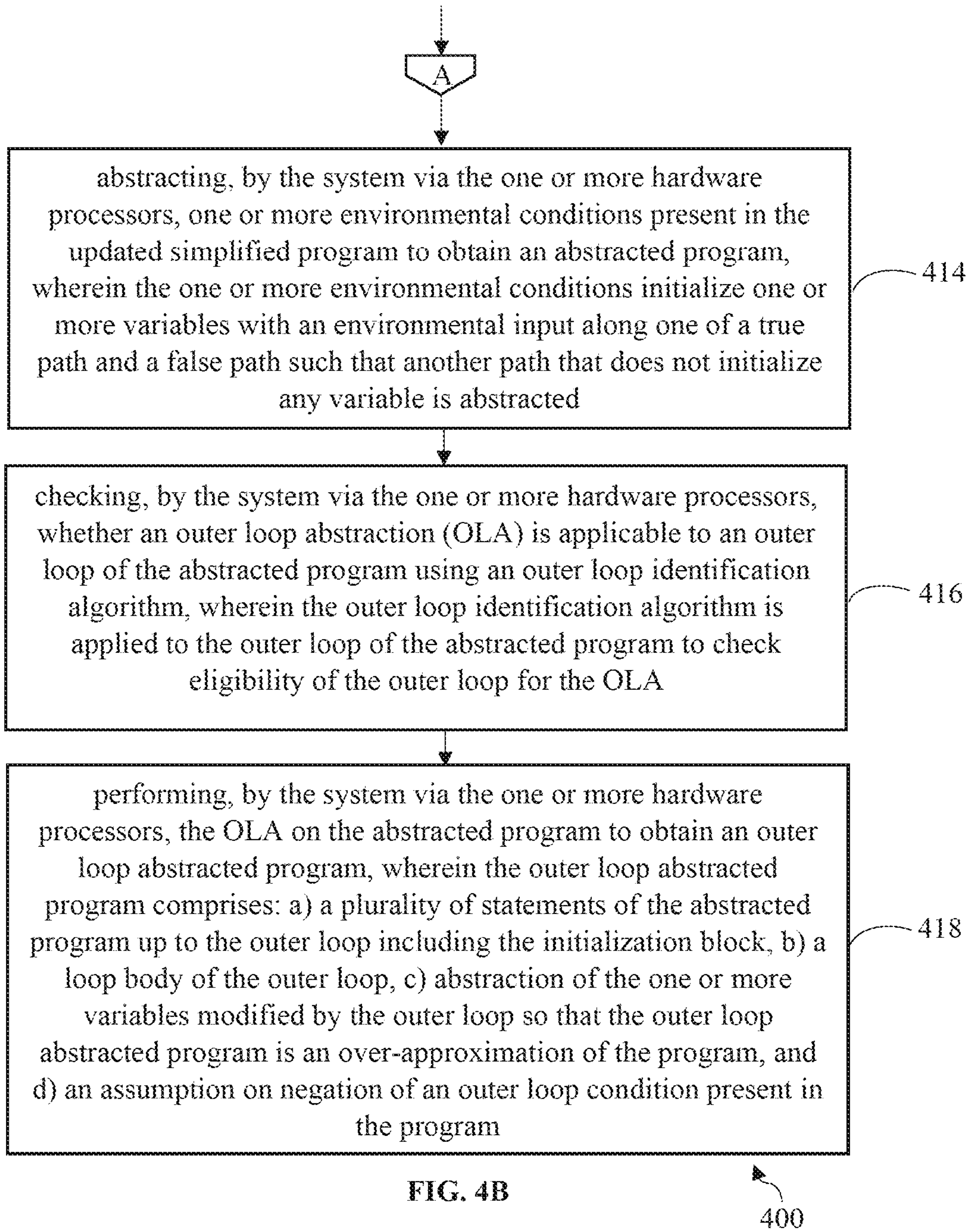

FIGS. 4A and 4B, collectively, with reference to FIGS. 1 to 3, represent an exemplary flow diagram of a method 400 for performing outer loop abstraction for verification of reactive systems, in accordance with an embodiment of the present disclosure. The method 400 may use the system 102 of FIGS. 1 and 2 for execution. In an embodiment, the system 102 comprises one or more data storage devices or the memory 208 operatively coupled to the one or more hardware processors 206 and is configured to store instructions for execution of steps of the method 400 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 102 as depicted in FIG. 2 and FIG. 1.

At step 402 of the present disclosure, the one or more hardware processors 206 of the system 102 receive a program to be verified. The program includes a nested loop.

At step 404 of the present disclosure, the one or more hardware processors 206 of the system 102 perform a loop optimization of the received program to obtain an optimized program. The above step can be better understood by way of the following description.

In an embodiment, for performing the loop optimization of the received program, the system 102 optimizes a loop of the nested loop present in received program if the loop comprises of an initialization condition I. In an embodiment, the initialization condition is identified using an initialization condition identification algorithm. In particular, the loop is optimized if it has the initialization condition. The initialization condition identification algorithm that is used to identify initialization condition is mentioned below:

```
Procedure getInitCond(Loop l0) {
  Ivar = Loop counter variable of outer loop l0
  initVal= Initial value assigned to Ivar in l0
  c = first executable statement as condition in loop body l0
  if (c of form "Ivar = initVal") then return c
}
```

As per the initialization condition identification algorithm, if an outer loop counter variable 'Ivar' is initially set to 'initVal', and a first executable statement as condition 'c' in the outer loop checks for equality in the form of 'Ivar=initVal,' then the condition 'c' may considered as the initialization condition.

In an embodiment, the optimized program includes an initialization block controlled by an initialization condition placed outside and before the loop. In particular, the initialization block controlled by the I is moved before the loop.

At step 406 of the present disclosure, the one or more hardware processors 206 of the system 102 perform an abstraction of the optimized program to obtain a simplified program. In an embodiment, for performing abstraction of the optimized program, the system 102 assigns a non-deterministic value to each of: one or more conditions present in the outer loop of the optimized program that reads an environmental input, and one or more assignments present in the outer loop of the optimized program that reads the environmental input. The above step can be better understood by way of the following description.

The program abstraction is performed to make analysis of the property assertion easier as the abstraction changes the original input program into an abstraction which allows more behaviors than the original program. So, it allows all behaviors of the original program and some additional behaviors. Thus, in the abstraction, if the given property holds, then it also holds in the original input program. So, assignment of a non-deterministic (i.e., an arbitrarily selected value) to the conditions/assignments transforms the optimized program into a simplified program which is an abstracted program.

At step 408 of the present disclosure, the one or more hardware processors 206 of the system 102 perform a K-path interval analysis on each condition of one or more conditions that are present in the outer loop of the simplified program to obtain a truth value of a respective condition. In particular, the K-path interval analysis (a program analysis technique) is applied to the conditions present in the outer loop of the simplified program to determine the truth value of the conditions.

At step 410 of the present disclosure, the one or more hardware processors 206 of the system 102 mark at least one condition of the one or more conditions as a fixed condition in the outer loop of the simplified program if the truth value of the at least one condition is found to be true.

In an embodiment, in case the truth value of a condition is found to be false, the system 102 removes the condition and a true path of the condition in the simplified program to obtain the updated simplified program.

At step 412 of the present disclosure, the one or more hardware processors 206 of the system 102 make a true path of the fixed condition unconditional in the simplified program to obtain an updated simplified program. In an embodiment, the making of the true path of the fixed condition unconditional refers to removal of the fixed condition while keeping one or more statements presents in the true path of the fixed condition.

At step 414 of the present disclosure, the one or more hardware processors 206 of the system 102 abstract one or more environmental conditions present in the updated simplified program to obtain an abstracted program. In an embodiment, the one or more environmental conditions that initialize one or more variables with an environmental input along one of a: true path and false path such that another path does not initialize any variable are abstracted.

In at least one example embodiment, the abstraction of the one or more environmental conditions includes one or more of: 1) abstraction of the one or more environmental conditions present in the updated simplified program that initializes one or more variables only with the environmental input along its true path such that its false path does not initialize any variable, 2) removal of at least one environmental condition of the one or more environmental conditions such that the initialization of the one or more variables along the true path becomes unconditional, 3) abstraction of the one or more environmental conditions present in the updated simplified program that initializes variables only with environmental inputs along its false path, such that its true path does not initialize any variable, and 4) removal of at least one environmental condition of the one or more environmental conditions so that the initialization of the one or more variables along the false path becomes unconditional.

At step 416 of the present disclosure, the one or more hardware processors 206 of the system 102 check whether an outer loop abstraction (OLA) is applicable to an outer loop of the abstracted program using an outer loop identification algorithm mentioned below:

Procedure isLoopForOLA(Loop $l_0$)
  $G_{l_b}$ = PDG of outer loop body $l_b$
  V= set of variables read in inner loop / and defined in $l_0$
  D = definite definitions of V in $l_b$, reaching the top of /
  if (∀ d ∈ D, isDepOnEnv (d, $G_{l_b}$) ) then return true
    else return False
Procedure isDepOnEnv (Definition d, PDG $G_{l_b}$)
  n = getPDGnode(d, $G_{l_b}$)
  N = getTransitiveClosure (n, $G_{l_b}$)
if (∀ tn ∈ N, all Rvalues of tn are either EnvInput or loop constants)
 then return true
    else return False In particular, the outer loop identification algorithm is applied to the outer loop of the abstracted program to check eligibility of the outer loop for the OLA. The outer loop identification algorithm checks if variables V, read in the inner loop l are environmental variables by checking if the definitely reaching definitions D of variables V have an ultimate dependency on environmental input in an outer loop body $l_b$. In an embodiment, the outer loop body $l_b$ refers to a body of an outer loop present in the abstracted program without considering an outer loop condition and an inner loop body. Then, the Procedure isDepOnEnv( ) analyses this for a definition d, which has been obtained from the must reaching definitions analysis. The algorithm does this by transitively checking data and control dependence of d using a program dependence graph PDG $G_{l_b}$ extracted from the PDG of the abstracted code of outer loop body $l_b$. Further, Procedure getPDGnode ( ) returns the PDG node n corresponding to definition d from PDG $G_{l_b}$. Finally, Procedure getTransitiveClosure ( ) returns all nodes N in the transitive closure of node n in the PDG $G_{l_b}$, such that nodes N do not have any incoming edges. So, if the values read in the program statements corresponding to nodes N are either environmental inputs or loop constants, then definition d is ultimately dependent on the environmental input.

At step 418 of the present disclosure, the one or more hardware processors 206 of the system 102 performing the OLA on the abstracted program to obtain an outer loop abstracted program. In an embodiment, the outer loop abstracted program includes: a) a plurality of statements of the abstracted program up to the outer loop including the initialization block, b) a loop body of the outer loop of the abstracted program, c) abstraction of the one or more variables modified by the abstracted outer loop so that abstracted program is an over-approximation of the program, and d) an assumption on negation of an outer loop condition present in the program.

In an exemplary scenario, assume a program represented in FIG. 5A is received as an input by the system 102. The program code includes a nested loop. The program code comprises an outer loop at line number 1 and a property to be verified is encoded as an assertion in an inner loop at line number 10. As can be seen in the FIG. 5A, the property assertion depends on variables *x and z read by the inner loop in line numbers 8-9. The variables*x and z are outputs of the outer loop. Variable*x is assigned an environmental input only when the variable x is non-zero in the first iteration of the outer loop (line numbers 4-5). Variable x is non-zero only when i is zero in the first iteration of the outer (line numbers 2-3). Further, it is possible to read an environmental input into variable z in every iteration of the outer loop (line number 7).

So, a loop optimization is performed on the program to ensure that statements under the initialization condition are moved outside the loop to obtain the optimized program (see, FIG. 5B). Then, the abstraction is performed on the optimized program to obtain the abstracted program. In the abstracted program, non-deterministic values are assigned to all the conditions and assignments reading environmental inputs. So, i=env_input( )/1000 is replaced by i=env_input( ) in the abstracted program (see, FIG. 5B).

Once the abstracted program is available, a static analysis, such as k-path interval analysis is performed on a condition 'if (x!=0)' to evaluate the truth value of the condition. The truth value is found to be 'TRUE', so a TRUE path of the condition is made unconditional (see, line number 5 in FIG. 5C).

Thereafter, it is checked whether OLA can be applied, and upon determining that the OLA can be applied, the OLA is performed on the abstracted program to obtain the outer loop abstracted program (see, FIG. 5D). As can be seen in FIG. 5D, the outer loop abstracted program includes the assumption on negation of an outer loop condition present in the program (see, line numbers 11-12), along with the plurality of statements of the abstracted program up to the outer loop including the initialization block, the loop body of the abstracted outer loop, and the abstraction of the one or more variables modified by the abstracted outer loop so that outer loop abstracted program is an over-approximation of the program.

In an embodiment, once the outer loop abstracted program is available, the system 102 passes the outer loop abstracted program to a program verifier for property verification. In an embodiment, the program verifier can be any program verifier available in the art.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, existing loop abstraction techniques suffer in presence of nested loop, thereby making it difficult to use it for verification of systems using nested loops i.e., reactive systems. So, to overcome the disadvantages, embodiments of the present disclosure provide a method and a system for performing outer loop abstraction for verification of reactive systems. More specifically, the system and the method performs outer loop abstraction (OLA) to eliminate outer loop of a nested loop present in the system, by simplifying the program input to a model checker, thus ensuring efficient model checking. Further, the system performs property directed abstraction which helps in selective analysis of the program, and thus reducing the overall time taken in performing the verification of the program while enhancing the efficiency of industrial code verifiers that employ model checking for verification.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a system via one or more hardware processors, a program to be verified, wherein the program comprises a nested loop;

performing, by the system via the one or more hardware processors, a loop optimization of the received program to obtain an optimized program, wherein the optimized program comprises an initialization block controlled by an initialization condition placed outside and before the loop;

performing, by the system via the one or more hardware processors, an abstraction of the optimized program to obtain a simplified program;

performing, by the system via the one or more hardware processors, a K-path interval analysis on each condition of one or more conditions present in an outer loop of the simplified program to obtain a truth value of an associated condition;

marking, by the system via the one or more hardware processors, at least one condition of the one or more conditions as a fixed condition in the outer loop of the simplified program if the truth value of the at least one condition is identified to be true;

making, by the system via the one or more hardware processors, a true path of the fixed condition unconditional in the simplified program to obtain an updated simplified program;

abstracting, by the system via the one or more hardware processors, one or more environmental conditions present in the updated simplified program to obtain an abstracted program, wherein the one or more environmental conditions initialize one or more variables with an environmental input along one of a true path and a false path such that another path that does not initialize any variable is abstracted;

checking, by the system via the one or more hardware processors, whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and performing, by the system via the one or more hardware processors. the OLA on the abstracted program to obtain an outer loop abstracted program, wherein the outer loop abstracted program comprises: a) a plurality of statements of the abstracted program up to the outer loop including the initialization block, b) a loop body of the outer loop of the abstracted program, c) abstraction of the one or more variables modified by the abstracted outer loop so that the outer loop abstracted program is an over-approximation of the program, and d) an assumption on negation of an outer loop condition present in the program.

2. The processor implemented method of claim 1, wherein performing the loop optimization of the received program comprises:

optimizing, by the system via the one or more hardware processors, a loop of the nested loop present in received program if the loop comprises of the initialization condition, wherein the initialization condition is identified using an initialization condition identification algorithm.

3. The processor implemented method of claim 1, wherein performing the abstraction of the optimized program comprises:

assigning, by the system via the one or more hardware processors, a non-deterministic value to each of: one or more conditions present in the outer loop of the optimized program that reads an environmental input, and one or more assignments present in the outer loop of the optimized program that reads the environmental input.

4. The processor implemented method of claim 1, wherein making the true path of the fixed condition unconditional comprises of removal of the fixed condition while keeping one or more statements present in the true path of the fixed condition.

5. The processor implemented method of claim 1, comprising:

upon identifying that the truth value of the condition is false, removing, by the system via the one or more hardware processors, the condition and a true path of the condition in the simplified program to obtain the updated simplified program.

6. The processor implemented method of claim 1, wherein the abstraction of the one or more environmental conditions comprises one or more of:

1) abstraction of the one or more environmental conditions present in the updated simplified program that initializes one or more variables only with the environmental input along its true path such that its false path does not initialize any variable;

2) removal of at least one environmental condition of the one or more environmental conditions such that the initialization of the one or more variables along the true path becomes unconditional;

3) abstraction of the one or more environmental conditions present in the updated simplified program that initializes variables only with environmental inputs along its false path, such that its true path does not initialize any variable; and 4) removal of at least one environmental condition of the one or more environmental conditions so that the initialization of the one or more variables along the false path becomes unconditional.

7. The processor implemented method of claim 1, comprising:

passing, by the system via the one or more hardware processors, the outer loop abstracted program to a program verifier for property verification.

8. A system, comprising:

a memory-storing instructions;

one or more communication interfaces; and one or more hardware processors coupled to the memory via the one or more communication interfaces, wherein the one or more hardware processors are configured by the instructions to:

receive a program to be verified, wherein the program comprises a nested loop;

perform a loop optimization of the received program to obtain an optimized program, wherein the optimized program comprises an initialization block controlled by an initialization condition placed outside and before the loop;

perform an abstraction of the optimized program to obtain a simplified program;

perform a K-path interval analysis on each condition of one or more conditions present in an outer loop of the simplified program to obtain a truth value of an associated condition;

mark at least one condition of the one or more conditions as a fixed condition in the outer loop of the simplified program if the truth value of the at least one condition is identified as true;

make a true path of the fixed condition unconditional in the simplified program to obtain an updated simplified program;

abstract one or more environmental conditions present in the updated simplified program to obtain an abstracted program, wherein the one or more environmental conditions initialize one or more variables with an environmental input along one of a: true path and a false path such that another path that does not initialize any variable is abstracted;

check whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and perform the OLA on the abstracted program to obtain an outer loop abstracted program, wherein the outer loop abstracted program comprises: a) a plurality of statements of the abstracted program up to the outer loop including the initialization block, b) a loop body of the outer loop of the abstracted program, c) abstraction of the one or more variables modified by the abstracted outer loop so that the outer loop abstracted program is an over-approximation of the program, and d) an assumption on negation of an outer loop condition present in the program.

9. The system of claim 8, wherein for performing the loop optimization of the received program, the one or more hardware processors (204) are configured by the instructions to:

optimize a loop of the nested loop present in received program if the loop comprises the initialization condition, wherein the initialization condition is identified using an initialization condition identification algorithm.

10. The system of claim 8, wherein for performing abstraction of the optimized program, the one or more hardware processors (204) are configured by the instructions to:

assign a non-deterministic value to each of: one or more conditions present in the outer loop of the optimized program that reads an environmental input, and one or more assignments present in the outer loop of the optimized program that reads the environmental input.

11. The system of claim 8, wherein making the true path of the fixed condition unconditional comprises of removal of the fixed condition while keeping one or more statements present in the true path of the fixed condition.

12. The system of claim 8, wherein the one or more hardware processors are configured by the instructions to:

upon identifying that the truth value of a condition is false, remove the condition and a true path of the condition in the simplified program to obtain the updated simplified program.

13. The system of claim 8, wherein the abstraction of the one or more environmental conditions comprises one or more of:

1) abstraction of the one or more environmental conditions present in the updated simplified program that initializes one or more variables only with the environmental input along its true path such that its false path does not initialize any variable, 2) removal of at least one environmental condition of the one or more environmental conditions such that the initialization of the one or more variables along the true path becomes unconditional, 3) abstraction of the one or more environmental conditions present in the updated simplified program that initializes variables only with environmental inputs along its false path, such that its true path does not initialize any variable, and 4) removal of at least one environmental condition of the one or more environmental conditions so that the initialization of the one or more variables along the false path becomes unconditional.

14. The system of claim 8, wherein the one or more hardware processors are configured by the instructions to:

pass the outer loop abstracted program to a program verifier for property verification.

15. One or more non-transitory machine-readable information storage mediums comprising one or more instructions which when executed by one or more hardware processors cause:

receiving, by a system, a program to be verified, wherein the program comprises a nested loop;

performing, by the system, a loop optimization of the received program to obtain an optimized program, wherein the optimized program comprises an initialization block controlled by an initialization condition placed outside and before the loop;

performing, by the system, an abstraction of the optimized program to obtain a simplified program;

performing, by the system, a K-path interval analysis on each condition of one or more conditions present in an outer loop of the simplified program to obtain a truth value of an associated condition;

marking, by the system, at least one condition of the one or more conditions as a fixed condition in the outer loop of the simplified program if the truth value of the at least one condition is identified to be true;

making, by the system, a true path of the fixed condition unconditional in the simplified program to obtain an updated simplified program;

abstracting, by the system, one or more environmental conditions present in the updated simplified program to obtain an abstracted program, wherein the one or more environmental conditions initialize one or more variables with an environmental input along one of a true path and a false path such that another path that does not initialize any variable is abstracted;

checking, by the system, whether an outer loop abstraction (OLA) is applicable to an outer loop of the abstracted program using an outer loop identification algorithm, wherein the outer loop identification algorithm is applied to the outer loop of the abstracted program to check eligibility of the outer loop for the OLA; and performing, by the system, the OLA on the abstracted program to obtain an outer loop abstracted program, wherein the outer loop abstracted program comprises: a) a plurality of statements of the abstracted program up to the outer loop including the initialization block, b) a loop body of the outer loop of the abstracted program, c) abstraction of the one or more variables modified by the abstracted outer loop so that the outer loop abstracted program is an over-approximation of the program, and d) an assumption on negation of an outer loop condition present in the program.

* * * * *